UNITED STATES PATENT OFFICE.

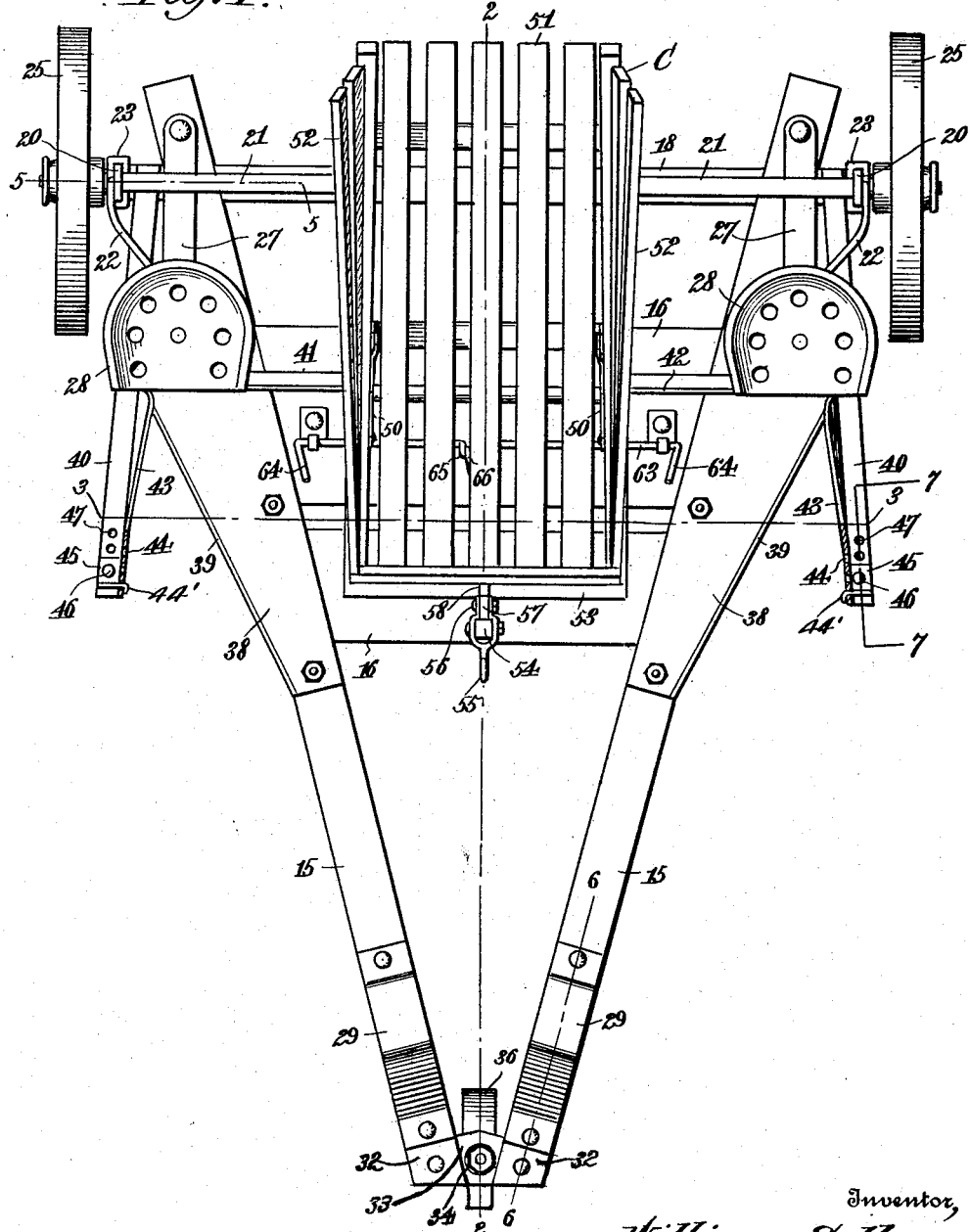

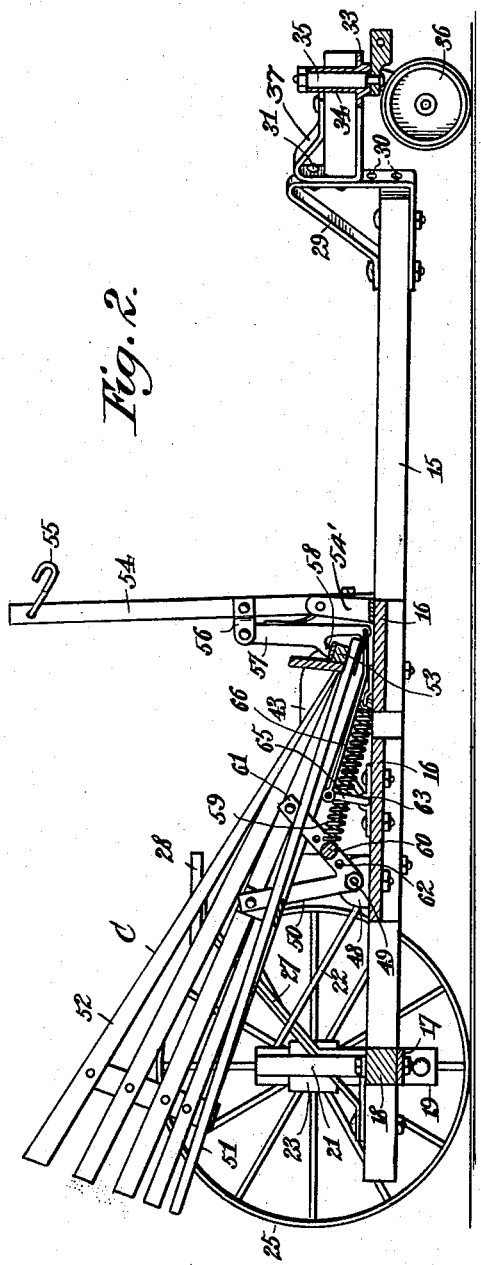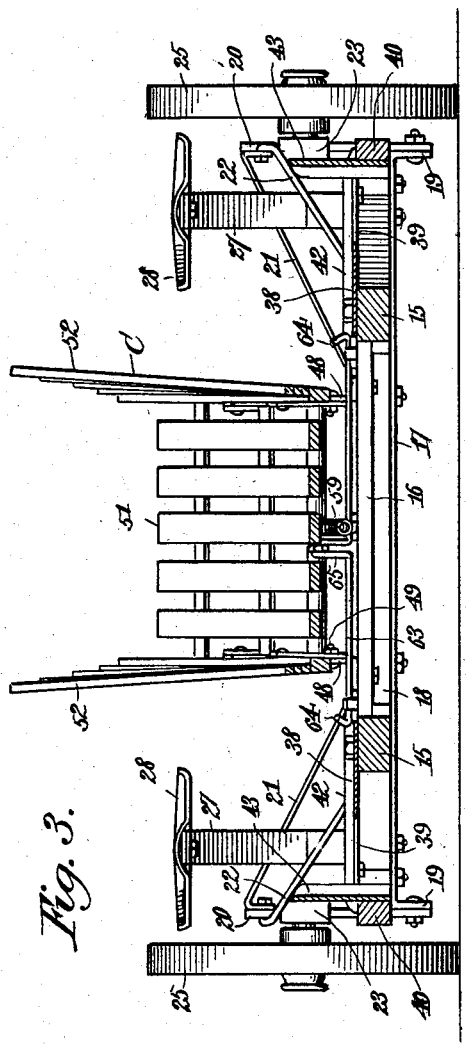

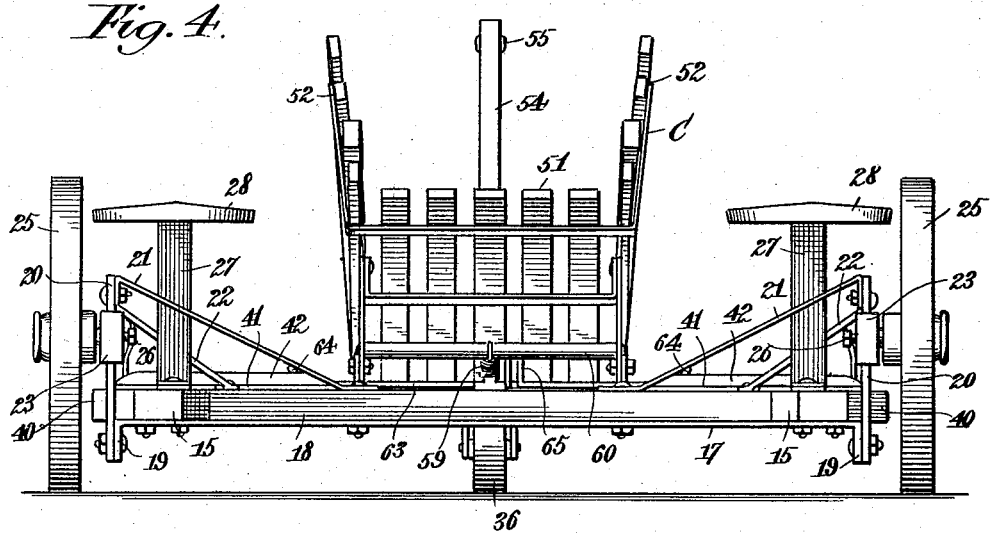
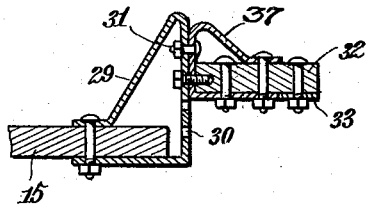
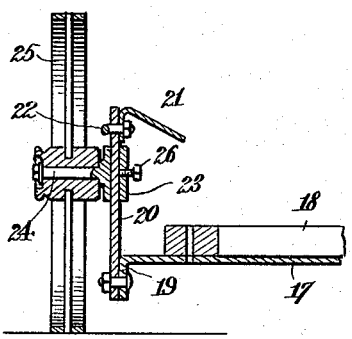

WILLIAM SELL, OF MAUNIE, ILLINOIS.

FODDER-CUTTER.

1,201,881.  Specification of Letters Patent.  Patented Oct. 17, 1916.

Application filed May 25, 1915. Serial No. 30,373.

*To all whom it may concern:*

Be it known that I, WILLIAM SELL, a citizen of the United States, residing at Maunie, in the county of White and State of Illinois, have invented new and useful Improvements in Fodder-Cutters, of which the following is a specification.

This invention relates to that class of machines which are used for cutting corn and the like for fodder, ensilage and other purposes.

The invention has for its object the production of a machine for simultaneously cutting two rows of corn, said machine being simple, inexpensive and efficient in operation.

A further object of the invention is the production of a machine of the character described having a tiltable cradle of improved construction on which the stalks may be placed as they are being cut, and whereby when a sufficient quantity has been accumulated or bunched, the same may be deposited on the ground without stopping the machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a machine constructed in accordance with the invention. Fig. 2 is a longitudinal vertical sectional view of the same taken on the line 2—2 in Fig. 1. Fig. 3 is a transverse sectional view taken on the line 3—3 in Fig. 1. Fig. 4 is a rear elevation. Fig. 5 is a vertical sectional view taken through one end of the axle and through one of the ground wheels on the line 5—5 in Fig. 1. Fig. 6 is a sectional detail view taken on the line 6—6 in Fig. 1. Fig. 7 is a sectional detail view taken on the line 7—7 in Fig. 1.

Corresponding parts in the several figures are denoted by like characters of reference.

The frame structure of the improved machine comprises forwardly convergent side members 15 which are spaced and connected intermediate their front and rear ends by cross pieces 16 constituting a platform. The rearward ends of the side members 15 are supported on a metal bar 17 which also supports the wooden axle 18, the ends of which abut on the inner faces of the side members. The ends of the axle bar 17 are downturned to form loops or brackets 19 with which the lower ends of uprights 20 are securely connected, the upper ends of said uprights being connected by braces 21, 22 with the wooden axle 18 and the side members 15, respectively. Mounted for vertical adjustment on each upright 20 is a sleeve 23 carrying a spindle 24 on which a ground wheel 25 is mounted for rotation; the sleeve being capable of being secured at various adjustments by means of a set screw 26. Spring bars 27 supporting the driver's or operator's seat 28 are mounted on the side members 15 near the rear ends of the latter. Securely connected with the front end of each side member 15 is a metallic strap, the same being bent so as to form a substantially triangular bracket 29, the front portion of which is provided with apertures 30 for the passage of a bolt 31. A front truck is provided, the same consisting of side members 32 connected together by a cross bar 33 carrying a sleeve 34 through which extends the shank 35 of a caster wheel 36. Each side member 32 is provided with a bracket 37 apertured for the passage of one of the connecting bolts 31, whereby the front truck is adjustably connected with the front end of the main frame.

It will be observed that by the construction described the main frame is vertically adjustable with respect to the ground wheels 25 and also with respect to the front truck, thus enabling adjustment to be made for the purpose of cutting corn stalks at such distance above the ground, as may be desired.

Supported on each frame member 15 adjacent to the platform 16 is a knife or cutting member 38, the oblique cutting edge of which, 39, diverges rearwardly with respect to the frame member on which it is mounted ed. Secured on the axle bar 17 adjacent to the ends thereof are forwardly extending guard bars 40, one guard bar projecting forwardly with respect to each knife or cutting member, said guard bars being also connected with the main frame adjacent to the rear end of the knife blade by means of an angle bar 41 having an upstanding flange 42 which lies in the path of the butt ends of the stalks that are being severed to prevent said butt ends from sliding rearwardly beyond said angle bar. Each of the guard bars 40 also carries an upwardly extending shield 43 which is slightly tilted inwardly and which will assist in gathering the corn stalks that are to be cut. The shield 43 has a plurality of apertures for the passage of a hook-shaped projection 44' formed on the vertical flange of an angle plate 45 which is secured on the guard bar 40 by means of a bolt 46 that is adapted to engage any one of a plurality of apertures 47 formed in the guard bar. The angle plate 45 may thus be adjusted longitudinally of the guard bar, the apertures 44 being so arranged that the hook or projection will coincide with one of them in any position to which the angle plate may be adjusted. The flange that rises vertically from the angle plate constitutes a foot rest, and it also serves to brace and reinforce the shield 43 against bending or lateral displacement. The foot rest may obviously be adjusted to any position that may be found most convenient for the operator.

The platform 16 is provided with upwardly extending lugs 48 which are apertured for the passage of transversely disposed pivot members, such as bolts 49 on which the cradle C is supported for rocking movement, said cradle being provided at each side with a downwardly extending V-shaped bracket 50 pivotally connected with the bolt or pivot member 49. The said cradle is a box structure composed mainly of slats, as shown, and comprising a bottom 51, side members 52, said cradle being also provided with a front cross bar 53. Mounted on the platform 16 in advance of the cradle is an upright 54 which may be secured by a brace 54', said upright having at its upper end a hook 55, constituting a rein support. The upright is provided near its lower end with a bracket 56 with which a spring actuated latch member 57 is pivotally connected, said latch member having an offset 58 lying in the path of the cross bar 53 of the cradle. The forward end of the cradle normally occupies a downwardly tilted position which is the receiving position, thereby maintaining the cross bar 53 normally in engagement with the latch member 57.

59 is a contractile spring, one end of which is connected with the platform, and the other end of which is connected with a cross bar 60 supported by and adjustably connected with the forward limbs 61 of the V-shaped brackets 50, said limbs being each provided with a plurality of apertures 62 to admit of the adjustment of the cross bar 60, whereby the degree of tension exerted by the spring 59 relative to the cradle may be regulated. The function of the spring 59 is to restore the cradle to its receiving position after it has been tilted rearwardly by the weight of the load placed thereon, such rearwardly tilting or discharging movement taking place when the latch member 57 is released. A rock shaft 63 supported on the platform 16 is provided at each end with a treadle 64, said rock shaft having also an arm 65 which is connected by a rod or link 66 with the spring-actuated latch member 57 which latter may thus, by pressure of the foot of one of the operators, be released from engagement with the cross bar 53 of the cradle, permitting the rearward end of the latter to tilt downwardly under the gravity of the load supported thereon.

In operation, the improved machine is drawn over the field in engagement with two rows of corn, it being obvious that the dimensions of the machine are so proportioned that the two rows of corn will be engaged by the knife blades or cutting members 38 and be thereby severed a proper distance from the ground, previously determined by vertical adjustment of the frame of the machine. The butt ends of the stalks will be prevented by the upstanding flanges of the angle bars 41 from moving rearwardly of said angle bars, enabling the severed stalks to be grasped by the operator at either side of the machine, the stalks being deposited in the cradle with their butt ends pointing rearwardly until a sufficient load has been accumulated, when by pressure on the treadle 64 the latch member 57 may be moved to a non-obstructing position with respect to the front end of the cradle, which latter will now tilt downwardly at its rear end, depositing the load on the ground. The cradle will be restored to its initial receiving position by the action of the contractile spring 59. The load may be tied to form a shock before or after being deposited on the ground, as may be preferred.

Having thus described the invention, what is claimed as new, is:—

1. In a fodder cutter, a wheel supported frame having forwardly convergent side members, and cutting blades mounted on said side members, said blades having cutting edges extending beyond and diverging rearwardly with respect to the side members, in combination with guard bars supported adjacent to the side members of the frame, and angle bars connecting said guard bars with the frame structure and having upstanding flanges lying directly in the path of the butt ends of severed stalks.

2. In a fodder cutter, a wheel supported frame having forwardly convergent side members and cutting blades carried thereby, guard bars spaced from the side members and having upstanding shields, and angle bars connecting the guard bars with the frame structure to the rearward of the shields and the cutting members and having upstanding flanges lying directly in the path of the butt ends of severed stalks.

3. In a fodder cutter, the combination with ground wheels and a front truck, of a frame structure supported for vertical adjustment with respect to the same, said frame structure including an axle bar, side members, a wood axle and guard bars supported on said axle bar, cutting blades mounted on the side members of the frame, shields supported on the guard bars, and angle bars connecting the guard bars with the frame structure to the rearward of the shields and the cutting members, said angle bars having upstanding flanges.

4. In a fodder cutter, a wheeled frame structure, a cutting member having a cutting edge disposed obliquely to the line of travel, a guard bar disposed divergently with respect to the cutting edge, an upwardly extending shield on the guard bar, said shield having a plurality of apertures, an angle plate adjustable on the guard bar, said angle plate having a vertically disposed flange provided with a hook engaging one of the apertures in the shield, and a seat supported to the rearward of the cutting member and the guard bar; the angle plate constituting a foot rest for the driver and a reinforcement for the shield.

In testimony whereof I affix my signature in presence of two witnesses.

WILLIAM SELL.

Witnesses:
ODUM MCCALLISTER,
HERMAN BECKER.

Copies of this patent may be obtained for five cents each, by addressing the "Commissioner of Patents, Washington, D. C."